US010153707B2

(12) United States Patent
Dilley et al.

(10) Patent No.: US 10,153,707 B2
(45) Date of Patent: Dec. 11, 2018

(54) RECONFIGURABLE POWER CONVERTER

(71) Applicant: EPC Power Corporation, Poway, CA (US)

(72) Inventors: Devin Dilley, Lakeside, CA (US); Ryan S Smith, San Diego, CA (US)

(73) Assignee: EPC POWER CORPORATION, Poway, CA (US)

( * ) Notice: Subject to any disclaimer, the term of this patent is extended or adjusted under 35 U.S.C. 154(b) by 0 days.

(21) Appl. No.: 15/094,997

(22) Filed: Apr. 8, 2016

(65) Prior Publication Data
US 2016/0301323 A1    Oct. 13, 2016

Related U.S. Application Data

(60) Provisional application No. 62/146,058, filed on Apr. 10, 2015.

(51) Int. Cl.
*H02M 7/00* (2006.01)
*H02M 1/10* (2006.01)
(Continued)

(52) U.S. Cl.
CPC .............. *H02M 7/003* (2013.01); *H02M 1/10* (2013.01); *G06F 1/18* (2013.01); *G06F 1/181* (2013.01); *G06F 1/182* (2013.01); *G06F 1/183* (2013.01); *G06F 1/184* (2013.01); *G06F 1/185* (2013.01); *G06F 1/186* (2013.01); *G06F 1/187* (2013.01);
(Continued)

(58) Field of Classification Search
CPC ................................ H02M 1/10; H02M 7/003
See application file for complete search history.

(56) References Cited

U.S. PATENT DOCUMENTS 5,196,995 A    3/1993   Gulczynski
5,631,504 A    5/1997   Adahan
(Continued)

FOREIGN PATENT DOCUMENTS

| EP | 2 887 519 | 6/2015 |
| WO | WO-2010/000315 | 1/2010 |
| WO | WO-2016/015329 | 2/2016 |

OTHER PUBLICATIONS

International Search Report and Written Opinion on PCT/US2016/026829, dated Jul. 11, 2016.

*Primary Examiner* — Fred E Finch, III
*Assistant Examiner* — Rafael O De Leon Domenech
(74) *Attorney, Agent, or Firm* — Foley & Lardner LLP

(57) ABSTRACT

A configurable power converter includes an interchangeable face plate mounted to a chassis and circuit terminals mounted to the face plate. Each of the circuit terminals are configurable as input or output circuit terminals. The power converter also includes a direct current bus within the chassis that includes a positive terminal and a negative terminal. The power converter also includes electrical switches connected between the positive and negative terminals. The power converter further includes a controller that operates the electrical switches to provide electrical power to the direct current bus from power received from the input circuit terminals and operates the electrical switches to provide power to the output circuit terminals from power of the direct current bus. The input and output circuit terminals can each support alternating current power or direct current power.

18 Claims, 6 Drawing Sheets

(51) Int. Cl.
   *H02M 1/088*     (2006.01)
   *H02M 1/00*      (2006.01)
   *G06F 1/18*      (2006.01)

(52) U.S. Cl.
   CPC .............. *G06F 1/188* (2013.01); *G06F 1/189* (2013.01); *H02M 1/088* (2013.01); *H02M 2001/0009* (2013.01)

(56) References Cited

U.S. PATENT DOCUMENTS

| | | | |
|---|---|---|---|
| 5,675,750 | A | 10/1997 | Matsumoto et al. |
| 6,459,175 | B1 | 10/2002 | Potega |
| 6,700,808 | B2 | 3/2004 | MacDonald et al. |
| 6,791,853 | B2 | 9/2004 | Afzal et al. |
| 6,903,950 | B2 | 6/2005 | Afzal et al. |
| 6,937,490 | B2 | 8/2005 | MacDonald et al. |
| 7,227,278 | B2 | 6/2007 | Realmuto et al. |
| 8,267,726 | B1 * | 9/2012 | Love, II ................... H04Q 1/03 439/668 |
| 8,708,722 | B1 | 4/2014 | Walliser et al. |
| 9,203,299 | B2 | 12/2015 | Low et al. |
| 2008/0100276 | A1 | 5/2008 | Negoro |
| 2010/0039104 | A1 | 2/2010 | Petersen et al. |
| 2013/0003299 | A1 * | 1/2013 | Wissner ................ H02M 7/003 361/695 |
| 2013/0049677 | A1 | 2/2013 | Bouman |
| 2014/0035497 | A1 | 2/2014 | Vrankovic et al. |
| 2014/0192566 | A1 | 7/2014 | Yang |
| 2014/0293663 | A1 * | 10/2014 | Ledezma .............. H02M 5/458 363/37 |
| 2015/0207397 | A1 | 7/2015 | Koehler et al. |

\* cited by examiner

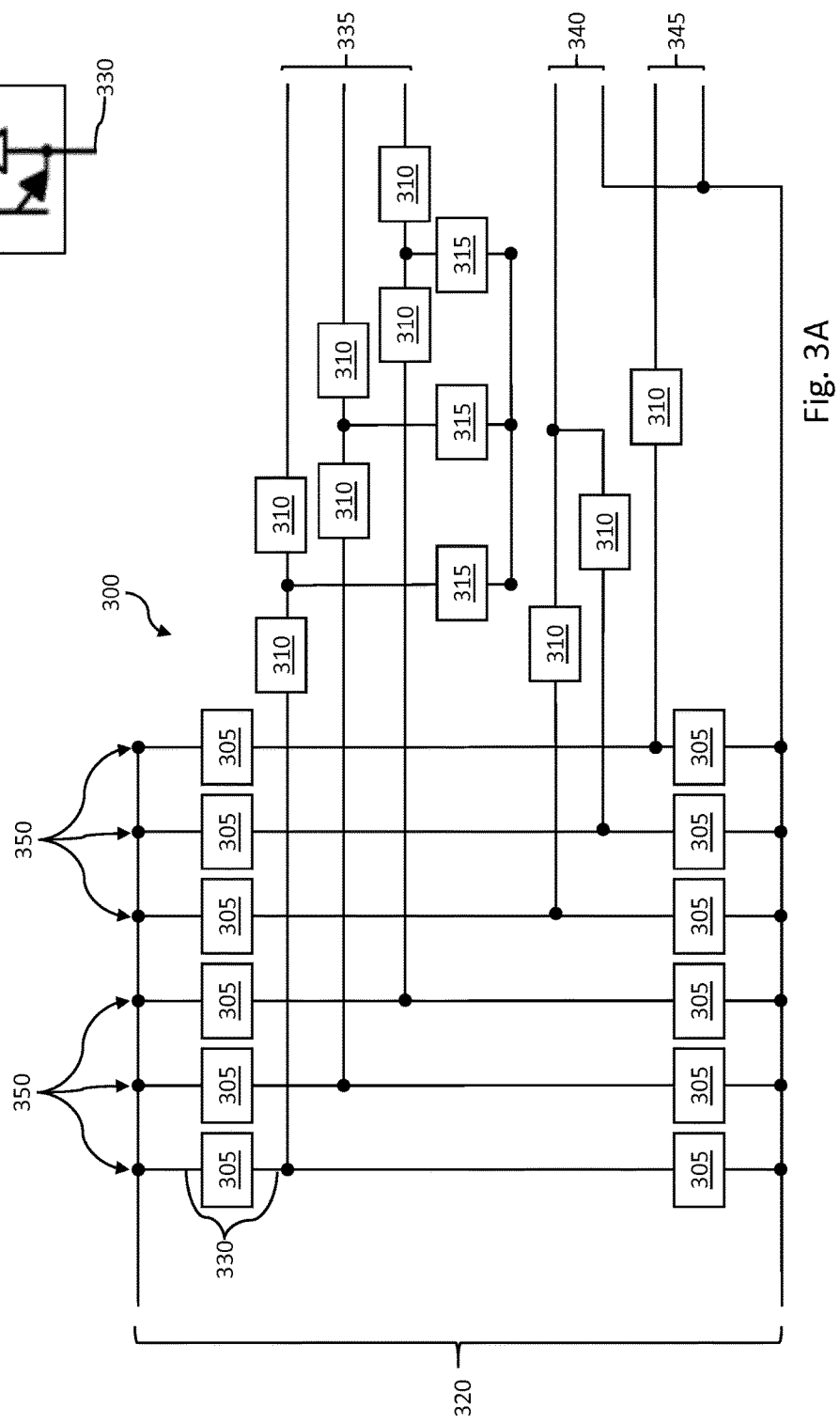

RECONFIGURABLE POWER CONVERTER

CROSS REFERENCE TO RELATED APPLICATIONS

The present application claims priority to U.S. Provisional Application No. 62/146,058 filed Apr. 10, 2015, which is incorporated herein by reference in its entirety.

BACKGROUND

The following description is provided to assist the understanding of the reader. None of the information provided or references cited is admitted to be prior art. In electronics, a power converter refers to a device that converts electrical energy from one form to another. Power converters can include direct current (DC) to DC converters, rectifiers that convert alternating current (AC) to DC, inverters that convert DC to AC, transformers, etc. Power converters have a myriad of practical applications, including providing AC power to an AC device using a DC power source, providing DC power to a DC device using an AC power source, stepping a DC voltage up or down to satisfy the requirements of a particular load, etc.

SUMMARY

An illustrative configurable power converter includes an interchangeable face plate mounted to a chassis and a plurality of circuit terminals mounted to the interchangeable face plate. Each of the plurality of circuit terminals are configurable as input circuit terminals or output circuit terminals. The configurable power converter also includes a direct current bus within the chassis. The direct current bus includes a positive terminal and a negative terminal. The configurable power converter also includes a plurality of electrical switches electrically connected between the positive terminal and the negative terminal of the direct current bus. The configurable power converter further includes a controller configured to operate the plurality of electrical switches to provide electrical power to the direct current bus from power received from the input circuit terminals and configured to operate the plurality of electrical switches to provide power to the output circuit terminals from power of the direct current bus. The input circuit terminals can each support alternating current power or direct current power. The output circuit terminals can each support alternating current power or direct current power. At least one of the plurality of circuit terminals supports alternating current power and at least one of the plurality of circuit terminals supports direct current power simultaneously.

In some embodiments, the configurable power converter further includes external direct current bus terminals that are configured to electrically connect to the positive terminal and the negative terminal of the direct current bus. In some embodiments, the external direct current bus terminals are mounted to the chassis. In some embodiments, each of the plurality of electrical switches includes a transistor with a gate and a diode, and the controller is configured to operate the plurality of electrical switches by providing electrical power to the gate of each transistor.

In some embodiments of the configurable power converter, at least one of the plurality of circuit terminals is configured to support three-phase alternating current power. In some embodiments, a first output circuit terminal of the plurality of terminals supports direct current power, and a second output circuit terminal of the plurality of terminals supports alternating current power. Some embodiments of the configurable power converter further include a plurality of interchangeable electrical filter elements electrically connected to each of the plurality of circuit terminals.

Some embodiments of the configurable power converter further include a plurality of electrical legs that each comprise at least two of the plurality of electrical switches. Each of the plurality of electrical legs are electrically connected to the positive terminal and the negative terminal of the direct current bus. Each of the plurality of circuit terminals are electrically connected to at least one of the plurality of electrical legs. In some embodiments, the at least two of the plurality of electrical switches of each of the plurality of electrical legs are connected in parallel. Each of the plurality of circuit terminals are electrically connected to the at least one of the plurality of electrical legs between the respective electrical switches.

Some embodiments of the configurable power converter further include memory configured to store a first set of settings and a second set of settings. The first set of settings are stored in the memory based on user inputs received from a manufacturer's user interface. The second set of settings are stored in the memory based on user inputs received from a customer's user interface. In some embodiments, the first set of settings includes an operable voltage range and an operable current range for each of the plurality of circuit terminals. The second set of settings includes a defined voltage range and a defined current range for each of the plurality of electrical switches. The defined voltage range is within the operable voltage range. The defined current range is within the operable current range.

In some embodiments, the operable voltage range of each of the plurality of circuit terminals corresponds to a voltage range supported by hardware associated with a respective one of the plurality of circuit terminals. The operable current range of each of the plurality of circuit terminals corresponds to a current range supported by hardware associated with a respective one of the plurality of circuit terminals. In some embodiments, the second set of settings includes an indication of which of the plurality of circuit terminals are input circuit terminals and which are output circuit terminals.

An illustrative method includes detecting, by a controller, a presence of a plurality of circuit terminals and a presence of a plurality of electrical switches. The method also includes determining, by the controller, which of the plurality of circuit terminals are output circuit terminals and which of the plurality of circuit terminals are input circuit terminals. The method further includes determining, by the controller, a maximum voltage limit and a maximum current limit for each of the plurality of circuit terminals and operating the plurality of electrical switches to provide electrical power to a direct current bus from power received from the input circuit terminals and to provide power to the output circuit terminals from power of the direct current bus. Operating the plurality of electrical switches does not include causing a voltage to exceed the maximum voltage limit for a respective one of the plurality of circuit terminals or causing a current to exceed the maximum current limit for a respective one of the plurality of circuit terminals. The input circuit terminals can each support alternating current power or direct current power. The output circuit terminals can each support alternating current power or direct current power.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 3A is a schematic of a power converter system in accordance with an illustrative embodiment.

FIG. 3B is a schematic of a switch in accordance with an illustrative embodiment.

Figures 1A, 1B:
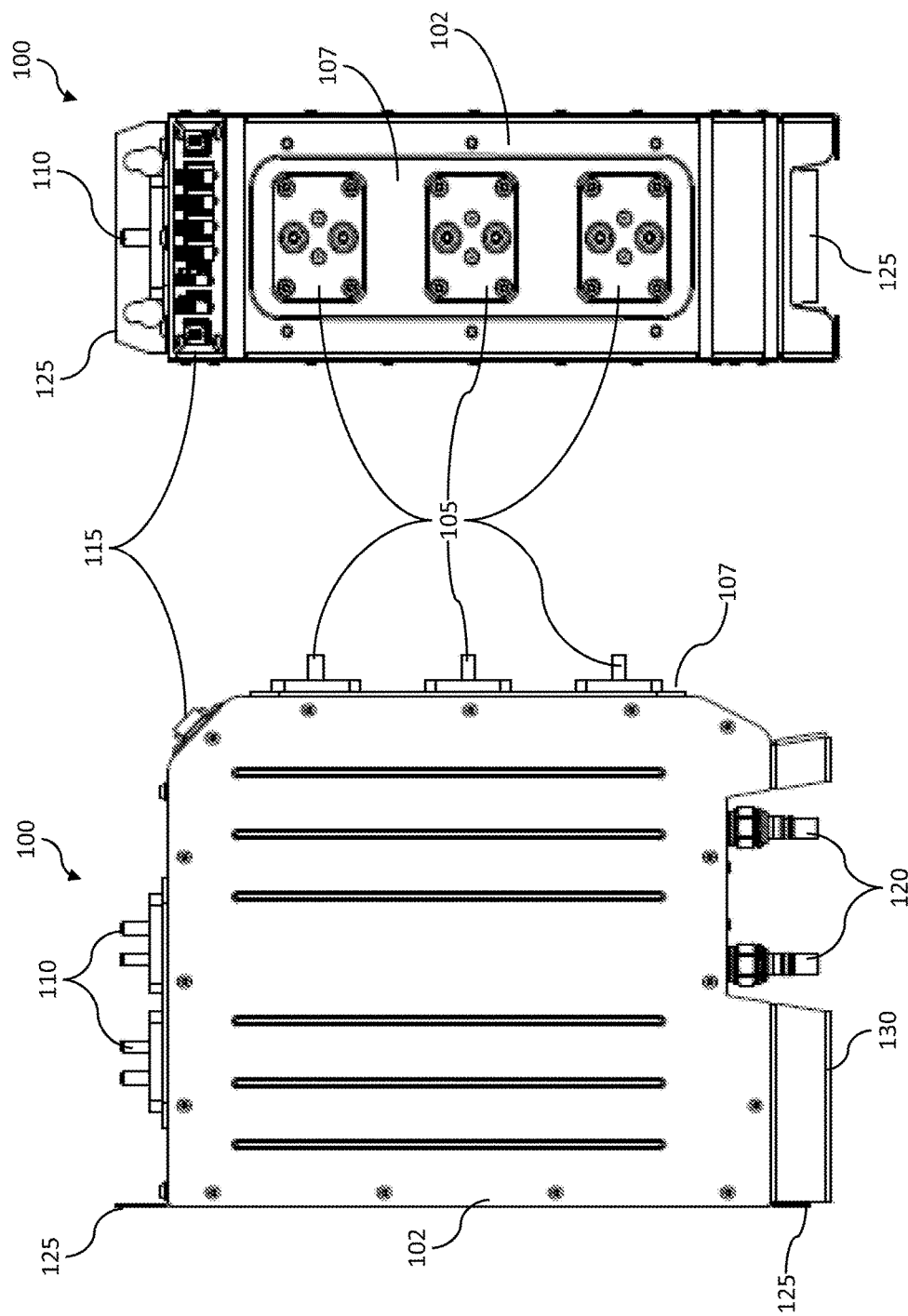
FIG. 1A is a side view of a power converter system having three main circuit terminals in accordance with an illustrative embodiment.
FIG. 1B is a front view of a power converter system having three main circuit terminals in accordance with an illustrative embodiment.
Figure 1E:
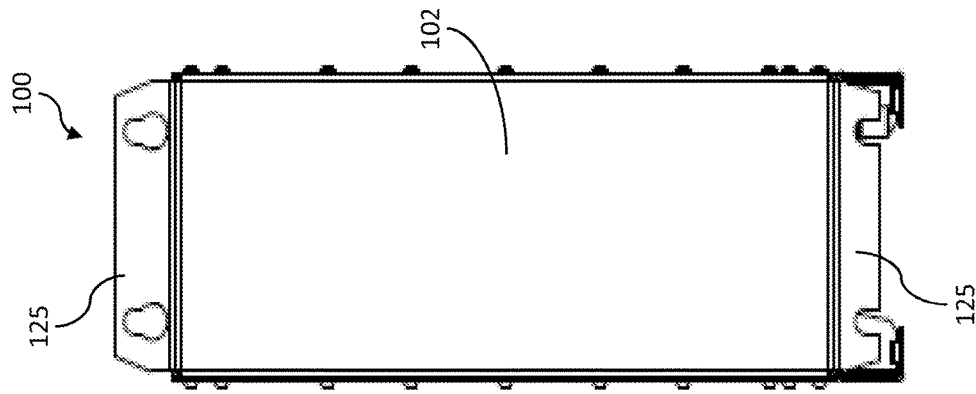
FIG. 1E is a rear view of a power converter system having three main circuit terminals in accordance with an illustrative embodiment.
Figure 1C:
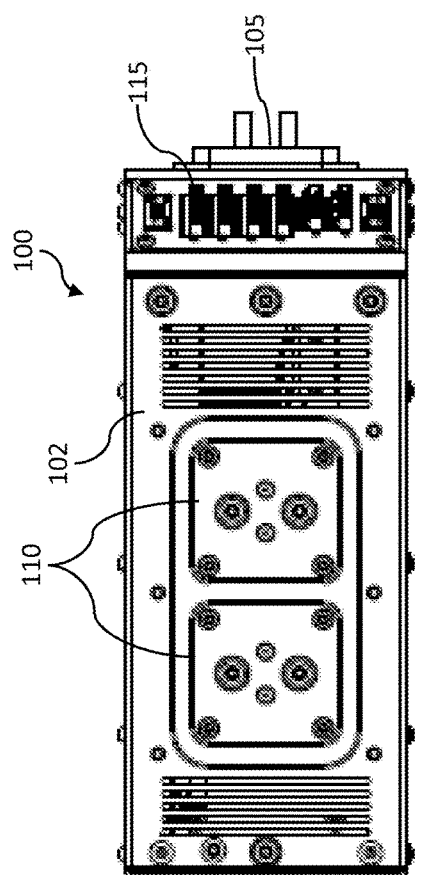
FIG. 1C is a top view of a power converter system having three main circuit terminals in accordance with an illustrative embodiment.
Figure 1D:
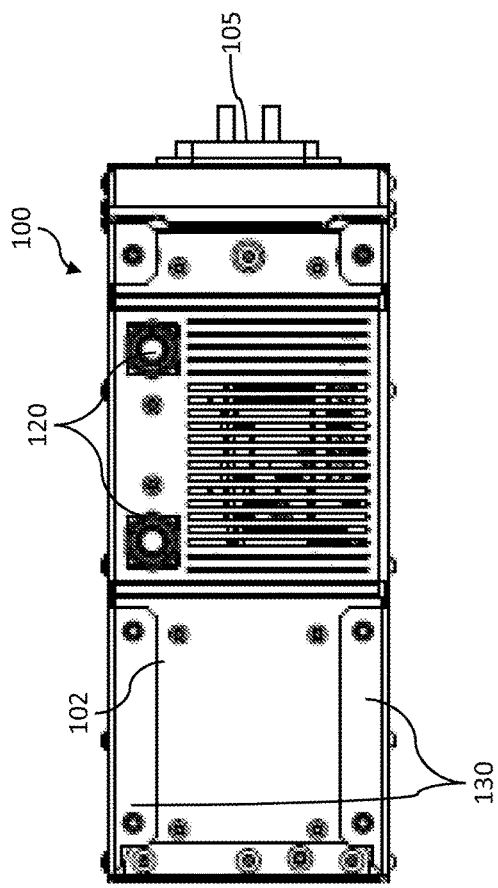
FIG. 1D is a bottom view of a power converter system having three main circuit terminals in accordance with an illustrative embodiment.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Power converters are used to convert electrical energy from one form to another. For example, a power converter can convert 12 Volts direct current (VDC) into 120 Volts alternating current (VAC). In another example, 120 VAC can be converted into 24 VDC or 480 VAC by a power converter. In yet another example, 120 VAC at 60 Hertz (Hz) can be converted to 120 VAC at 50 Hz.

Power converters can be purchased from a manufacturer for a specific purpose or to convert a known power form into another power form. For example, a user may have power provided from a utility service at 480 VAC, but the user may have a motor that uses 24 VDC. A power converter can be designed for that user to convert the 480 VDC power into 24 VDC. For the power converter manufacturer, to meet the various requirements from users that can specify virtually any electrical power form as an input and virtually any other power form as an output, it is advantageous for the manufacturer to be able to quickly and/or easily adapt a power converter platform to a customers' needs.

Various embodiments described herein provide a power converter platform that can be easily adapted to the requirements of many customers, each with its own particular requirements. FIGS. 1A-1E show views of a power converter system in accordance with an illustrative embodiment. The power converter system 100 includes main circuit terminals 105, a front plate 107, top terminals 110, a control connection panel 115, cooling ports 120, wall mounting brackets 125, and a floor mounting bracket 130. In alternative embodiments, additional, fewer, and/or different elements can be used.

In the embodiment shown in FIGS. 1A-1E, the power converter system 100 includes three main circuit terminals 105. Each of the main circuit terminals 105 includes two posts (e.g., a positive terminal post and a negative or common terminal post). The main circuit terminals 105 can be configured to receive two bolt cable shoe connectors, busbar connectors, or any other suitable electrical connector.

Figures 2A, 2B:
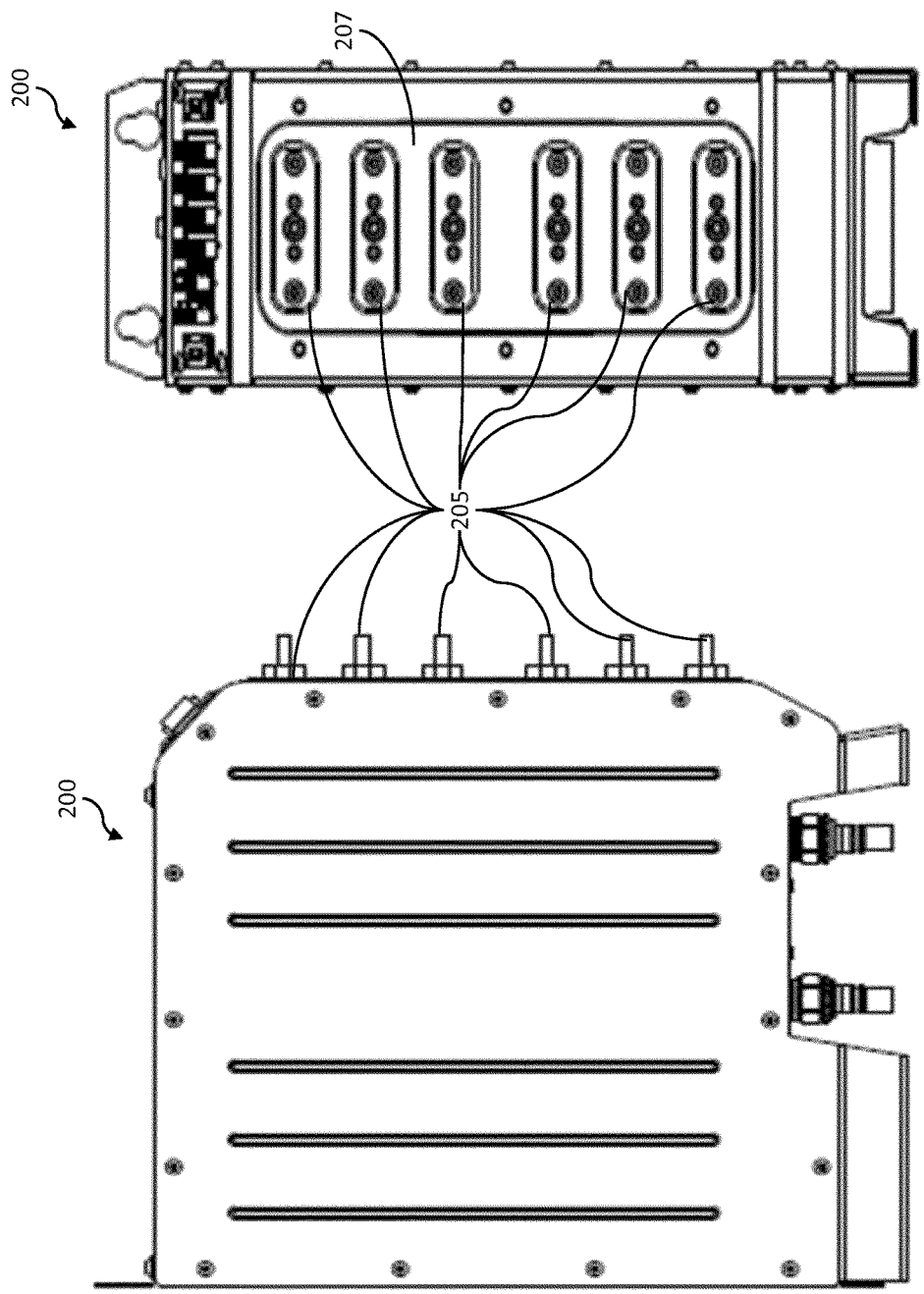
FIG. 2A is a side view of a power converter system having six main circuit terminals in accordance with an illustrative embodiment.
FIG. 2B is a front view of a power converter system having six main circuit terminals in accordance with an illustrative embodiment.

FIGS. 2A and 2B are views of a power converter system having six main circuit terminals in accordance with an illustrative embodiment. In an illustrative embodiment, each of the three main circuit terminals 205 can be configured to connect to any suitable power source or load. For example, two of the main circuit terminals 205 can be configured to be bidirectionally connected to a 240 VAC single-phase grid, one of the main circuit terminals 205 can be configured to be connected to a DC source such as a solar panel or battery, one of the main circuit terminals 205 can be configured to be connected to a 24 VDC load, and the remaining two terminals can be configured to connect to a +/−300 VDC source. In another example, four of the main circuit terminals 205 can be configured to be connected to a 480/277 VAC (three-phase plus neutral) power source, and two of the main circuit terminals 205 can be configured to be connected to a 400 VDC load.

In an illustrative embodiment, each of the three main circuit terminals 205 can be configured to connect to any suitable power source or load. For example, two of the main circuit terminals 205 can be configured to be bidirectionally connected to a 240 VAC single-phase grid, one of the main circuit terminals 205 can be configured to be connected to a DC source such as a solar panel or battery, one of the main circuit terminals 205 can be configured to be connected to a 24 VDC load, and the remaining two terminals can be configured to connect to a +/−300 VDC source. In another example, four of the main circuit terminals 205 can be configured to be connected to a 480/277 VAC (three phase plus neutral) power source, and two of the main circuit terminals 205 can be configured to be connected to a 400 VDC load.

The power converter system 100 has two top terminals 110. In alternative embodiments, the power converter system 100 has fewer or more than two top terminals 110. In an illustrative embodiment, the top terminals 100 are configured to be connected to a DC power source and the main circuit terminals 105 are configured to provide AC power to one or more loads. For example, the top terminals 100 can receive DC power and the three main circuit terminals 105 each provide one phase of three-phase AC power. In alternative embodiments, the top terminals 110 can be configured to provide DC power, and the main circuit terminals 105 can be configured to receive AC power (e.g., three-phase AC power). That is, AC power input into the main circuit terminals 105 can be converted into DC power output by the top terminals 110.

In alternative embodiments, the power converter system 100 can include fewer than or more than three main circuit terminals 105. For example, in the embodiment shown in FIGS. 2A and 2B, the power converter system 200 includes six main circuit terminals. FIG. 2A is a side view of a power converter system having six main circuit terminals, and FIG. 2B is a front view of a power converter system having six main circuit terminals in accordance with an illustrative embodiment. In alternative embodiments, the power converter system 100 or the power converter system 200 can have any suitable number of main circuit terminals.

FIG. 3A is a schematic of a power converter system in accordance with an illustrative embodiment. The schematic 300 includes switches 305, inductors 310, capacitors 315, DC bus terminals 320, circuit terminals 335, circuit terminals 340, and circuit terminals 345. In alternative embodiments, additional, fewer, and/or different elements may be used.

In an illustrative embodiment, the power converter schematic 300 can be used as an inverter. For example, the circuit terminals 335 can be connected to a three-phase AC power source, such as 480 VAC from a generator or a power grid. Filter elements such as the inductors 310 and/or the capacitors 315 can be used to filter the power incoming into the power converter system. As shown in FIG. 3A, each of the circuit terminals 335, the circuit terminals 340, and the circuit terminals 345 can include filter elements that filter the power output from (or input to) the circuit terminals. For example, each of the circuit terminals 335, the circuit terminals 340, and the circuit terminals 345 include inductors 310 and capacitors 315. In the embodiment shown in FIG. 3A, one conductor (e.g., a common or ground conductor) of each of the circuit terminals 335 connected to a capacitor 315, and each capacitor 315 is connected in common with one another. In alternative embodiments, any suitable electrical filtering mechanism or elements may be used. In some embodiments, the DC bus terminals 320 can include filter components, such as a capacitor connected between the DC bus terminals 320.

In alternative embodiments, any suitable arrangement of filter elements or any suitable filter elements can be used. For example, the type and arrangement of filter elements can be chosen based on a particular use of the power converter system. In an illustrative embodiment, the circuit terminals 335 can connect to three of the main circuit terminals 105 or main circuit terminals 205. In some embodiments, the filter elements are re-configurable by adding or removing filter elements to the power converter system 100. In some embodiments, the power converter system may not include filter components.

As shown in FIG. 3A, each phase of the circuit terminals 335 can be connected to one of the legs 350. Each of the legs 350 includes two switches 305 and a connection to a terminal. The switches 305 can be any suitable switching device. For example, FIG. 3B is a schematic of a switch in accordance with an illustrative embodiment. The switch 305 is connected in line with a conductor at connection points 330. The switch 305 of FIG. 3B includes a bipolar transistor and a diode. In alternative embodiments, the switch 305 can include any suitable transistor such as a metal-oxide-semiconductor field-effect transistor (MOSFET). In alternative embodiments, any suitable switch can be used. For example, the switch 305 may not include a diode. In another example, the switch 305 is bi-directional. Each of the switches of FIG. 3A can be independently controlled by selectively applying power to the gate 325. For example, a controller can apply power to the gate 325 of each switch 305 of the schematic 300.

In some embodiments, additional legs 350 can be included in the architecture of a power converter system, but not used. For example, one or more main circuit terminals 105 may not be used. Thus, a base architecture can be used for multiple customer requirements. The switches 305 can be used to control the voltage and/or current flowing to or from either of the DC bus terminals 320. For example, the switches 305 corresponding to the circuit terminals 335 can be controlled to provide a constant or rectified voltage across the DC bus terminals 320.

In an illustrative embodiment, the circuit terminals 345 can be configured to receive DC power. For example, the circuit terminals 345 can be electrically connected to a solar power source, a battery, etc. As shown in FIG. 3A, one of the two electrical connections of the circuit terminals 345 is electrically connected to one of the DC bus terminals 320 (e.g., the negative terminal of the DC bus). In some embodiments, either the negative or positive terminal of the DC bus can be grounded. The switches 305 associated with the leg 350 to which the positive terminals of the circuit terminals 345 is connected can be used to provide a DC voltage across the DC bus terminals 320. In embodiments in which the circuit terminals 335 and the circuit terminals 345 are connected to power sources, each of the corresponding switches 305 can be operated to provide the same DC voltage across the DC bus terminals 320. For example, the switches 305 associated with the circuit terminals 335 can be operated to rectify a three-phase power supply to 800 VDC across the DC bus terminals 320, and the switches 305 associated with the circuit terminals 345 can be operated to buck the 800 VDC (at the terminals 320) down to 24 VDC at the circuit terminals 345.

In an illustrative embodiment, the circuit terminals 340 can be connected to a DC power load, such as a battery or other energy storage device. In the embodiment illustrated in FIG. 3A, two legs 350 are used to provide power to the positive terminal of the circuit terminals 340. Using two legs 350 can double the amount of current that can pass through the circuit terminals 340 without damaging the switches 305 and/or circuit filters such as the inductors 310 compared to connecting the positive terminals of the circuit terminals 340 to only one of the legs 350. In alternative embodiments, a circuit terminal (such as the circuit terminals 340) can be connected to more than two legs 350. For example, a circuit terminal can be connected to three, four, five, six, etc. legs 350.

For example, a power converter in accordance with the schematic 300 can receive power from a solar power source (or any other suitable power source) at the circuit terminals 340 when the solar power source supplies power (e.g., during sunny days). The power received from the solar power source can be boosted to provide power to the DC bus, and converted into a suitable power to power a battery or other DC load via circuit terminals 340. In some embodiments, the solar power source provides 400 VDC, the DC bus voltage is 750 VDC, and the voltage of the circuit terminals 340 (e.g., connected to a battery or other DC load) is 100 VDC. In alternative embodiments, any suitable voltages can be used.

Following the example above, if the solar power source is not providing power to the power converter (e.g., during night), the DC load connected to the circuit terminals 340 can be powered by converting three-phase AC power connected to the circuit terminals 335, which can be supplied by a traditional power grid. For example, 480 V three-phase AC power can be rectified to provide 750 VDC at the DC bus. The 750 VDC at the DC bus can, in turn, be converted into the 100 VDC for the DC load.

In an alternative example, the solar power source can be used to charge a battery connected to the circuit terminals 340. The battery can, in turn, be used to power another DC load. When the battery is charged, power supplied to the DC bus from the solar power source can be inverted into three-phase AC power, supplied to the circuit terminals 335. For example, the three-phase AC power can be supplied to a power grid.

In yet another embodiment, the DC bus terminals 320 can be electrically connected to an external power source or load, such as via the top terminals 110. For example, a DC power source can be used to supply power to the DC bus terminals 320. The various switches 305 of each of the legs 350 can be used to convert the DC power from the DC power source into any suitable power form, such as a lower DC voltage or an AC voltage of any suitable frequency or shape. Similarly, one or more of the circuit terminals (such as the circuit terminals 335, the circuit terminals 340, the circuit terminals 345, the main circuit terminals 110, or the main circuit terminals 210) can also be connected to a power source (either AC or DC) to provide power to the DC bus. Accordingly, any of the terminals can be configured to provide power or to receive power of any suitable voltage. Similarly, any of the circuit terminals can be configured to be connected to an AC or DC power source or load. Further, in some embodiments, the AC power of any of the circuit terminals can be any suitable frequency or shape (e.g., sinusoidal, square wave, saw tooth, or any arbitrary shape). The various configurations are compatible by controlling the switches 305 of each of the legs 350.

As mentioned above with reference to FIGS. 1A-1E, the main circuit terminals 105 of the power converter system 100 can be configured to input or output any suitable power form. In such an embodiment, a chassis 102 of the power converter system 100 can include the switches 305, the legs 350, and the DC bus as explained above. Any suitable number of legs 350 can be used. Such a chassis 102 can be used as the base of virtually any customer's needs. That is, the main circuit terminals 105 can be connected to the legs 350 in any suitable manner. Similarly, the switches 305 can be operated in any suitable manner from a controller. For example, to the base chassis 102 can be added the top terminals 110 (corresponding to the DC bus terminals 320) and any suitable number of main circuit terminals 105. That is, the configuration of the circuit terminals 335, the circuit terminals 340, and the circuit terminals 345 of the schematic 300 is merely one implementation. Some embodiments may not include three phase AC power, some may not include AC inputs or outputs, some may not include DC inputs or outputs, etc.

Figure 4:
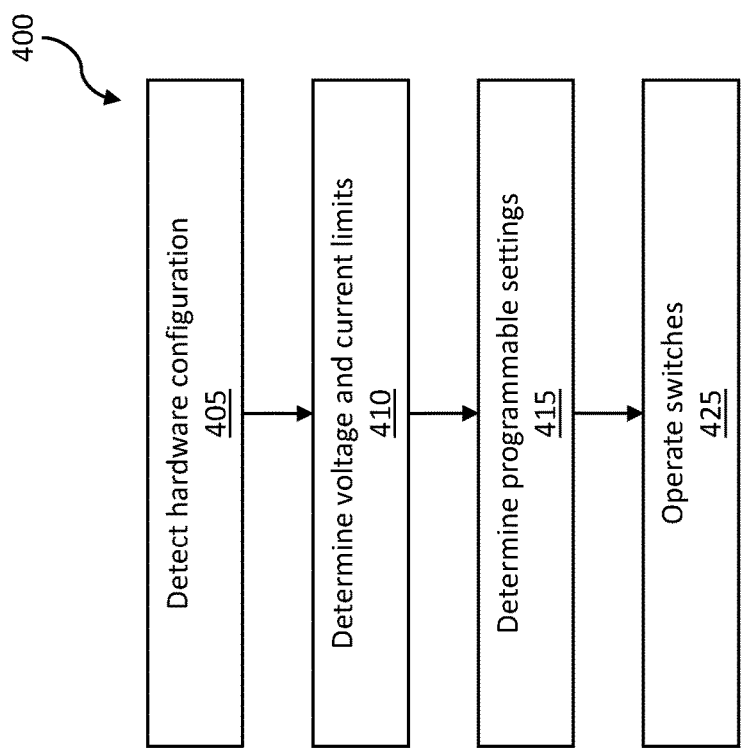
FIG. 4 is a flow chart of a method for operating a power converter system in accordance with an illustrative embodiment.

FIG. 4 is a flow chart of a method for operating a power converter system in accordance with an illustrative embodiment. In alternative embodiments, additional, fewer, and/or different operations may be performed. Also, the use of a flow chart and arrows is not meant to be limiting with respect to the order or flow of operations. For example, in some embodiments, two or more operations may be performed simultaneously.

In an operation 405, hardware configuration is detected. For example, a controller or processor is communicatively connected to switches, sensors, or other hardware. The controller can scan the input and output ports of the controller to determine which switches, sensors, or other hardware that the controller is communicatively connected with. That is, the controller can determine which switches or other hardware that the controller can operate, and the controller can determine which sensors or other hardware (e.g., voltage sensors, current sensors, etc.) provide information to the controller.

In some embodiments, a base platform power controller can be modified and configured for a particular user's requirements. In such an embodiment, a similar controller with similar programming can be used for multiple users' power controllers each with different hardware configurations. In an illustrative embodiment, the operation 405 determines the specific hardware configuration for the particular power converter system.

In an operation 410, voltage and current limits are determined. In an illustrative embodiment, the controller determines the voltage and current limits of each circuit terminal by communicating with stored memory within the converter or by directly sensing circuit parameters (e.g., main circuit terminals 105, top terminals 110, etc.). The determination of the voltage and current limits can be based on the determined hardware configuration. For example, the controller can determine which type of switches 305 are used. Based on the type of switches 305, the controller can determine the voltage and current limits of the switches 305. In an illustrative embodiment, the controller determines the number of legs 350 connected to a circuit terminal. For example, the circuit terminals 345 are connected to one of the legs 350, and the circuit terminals 340 are connected to two legs 350. In an illustrative embodiment, at the same voltage, the current limit of the circuit terminals 340 is twice the current limit of the circuit terminal 345. In alternative embodiments, a circuit terminal can be connected to any suitable number of legs 350.

In an operation 415, programmable settings are determined. In an illustrative embodiment, programmable settings are stored in one or more memory devices accessible by the controller. In an embodiment, the programmable settings are stored by the manufacturer of the power converter system. For example, a controller can include a communications port that can communicate to edit programmable settings with another computing device, such as a laptop computer. In some embodiments, the power converter system can include an interface panel that is mounted to the chassis of the power converter system (e.g., the control connection panel 115). In an alternative embodiment, some of the programmable settings are stored by the manufacturer and are not re-programmable by a user (e.g., a customer), and some of the programmable settings are re-programmable by the user. For example, a first set of programmable settings that are not re-programmable by a user can indicate the configuration of the circuit terminals. For example, the configuration of a circuit terminal can include programmed voltage and current limits, an indication of the type of terminal (e.g., a power input circuit terminal or a power output circuit terminal), the type of power for the circuit terminal (e.g., voltage of DC power, waveform of AC power, frequency of AC power). A second set of programmable settings that can be re-programmed by the user. In an illustrative embodiment, the re-programmable settings can include voltage or current limits of one or more circuit terminals or whether a circuit terminal operates as an input or an output.

In an illustrative embodiment, the first set of programmable settings that are not re-programmable by the user include maximum voltage and current limits that are determined based on the capabilities of the hardware. In such an embodiment, the user can adjust the settings that indicate whether a main circuit terminal is to be used as an input or an output, whether a main circuit terminal is to be AC power or DC power, the voltage and/or current of any DC terminal, the voltage and/or frequency of any AC terminal, the voltage of the DC bus, and voltage and current limits for each circuit terminal. For example, a power converter system can be sent to a customer with factory settings. The factory settings can indicate that a first main circuit terminal is an AC input terminal, a second main circuit terminal is a DC input terminal, and a third main circuit terminal is an AC output terminal. The user can adjust the programmable settings such that the first circuit terminal is an AC output terminal, the second main circuit terminal is an AC input terminal, and the third main circuit terminal is a DC input terminal. In other example, the user can adjust settings for any main circuit terminal to be either an input or an output, and the user can adjust settings for any main circuit terminal to be either AC or DC. That is, each terminal can be arbitrarily assigned by a user. In some instances, one or more of the main circuit terminals support AC (either as an input or an output) and one or more of the main circuit terminals support DC (either as an input or an output) simultaneously.

In an illustrative embodiment, hard-coded factory voltage or current limits can be used by the controller and the user can adjust the voltage or current limits of the power converter system within the hard-coded voltage or current limits. For example, the manufacturer of the power converter can determine that the maximum safe current through a circuit terminal is 300 Amperes (A). The user can adjust the current limit for the circuit terminal to be within the 300 A limit. For example, the user may limit the current to 200 A to protect the load connected to the circuit terminal. However, the user cannot exceed the 300 A limit set by the manufacturer. The voltage or current limit can be based on the limits of the components of the power converter, such as the switches 305. In some embodiments, the voltage or current limits that the user cannot exceed is determined in the operation 410. In alternative embodiments, the voltage or current limits are stored in memory by the manufacturer.

In an operation 425, switches are operated. In an illustrative embodiment, the controller operates switches such as the switches 305 to convert input power from the input circuit terminals to the DC bus and to convert power from the DC bus to the output circuit terminals. In an illustrative embodiment, the switches are operated based on the determined hardware configuration, the determined voltage and current limits (e.g., the voltage and current limits of the hardware and the voltage and current limits stored in the programmable settings), and the programmable settings.

Referring back to FIGS. 1A-1E, an illustrative power converter system 100 includes a control connection panel 115. The control connection panel 115 can be used to receive one or more control signals. The control signals can by any suitable type of signals such as analog, discrete, or digital. Any suitable communication protocol can be used. The control signals can be received via a wired or a wireless connection. In an illustrative embodiment, a control signal can be used to indicate one or more of a voltage, a current, or a frequency of one or more of the main circuit terminals 105. In an illustrative embodiment, the operation 425 operates the switches based on the received control signals.

In an illustrative embodiment, the control connection panel 115 includes a connection that provides power to the controller. In some embodiments, the control connection panel 115 includes output connections. The output connections can allow the power converter system 100 (e.g., a controller of the system) to operate one or more peripheral components such as control relays.

The hardware configurations of the power converter system 100 can be modified for any suitable application. For example, the power converter system 100 includes two top terminals 110. In alternative embodiments, the top terminals 110 can be removed from the power converter system 100, one top terminals 110 can be used, or more than two top terminals 110 can be used. Similarly, the power converter system 100 of FIGS. 1A-1E includes three main circuit terminals 105. The three main circuit terminals 105 are mounted to a front plate 107. The front plate 107 can be removed from the power converter system 100 and replaced with a different front plate 107 that is configured to have mounted different main circuit terminals 105. For example, the front plate 207 is configured to have mounted six main circuit terminals 205. In alternative embodiments, any suitable front plate 107 or front plate 207 can be configured to have mounted any suitable size, shape, and number of main circuit terminals. In an illustrative embodiment, hardware internal to the power converter system 100 (e.g., the DC bus and the switches 305) is the same regardless of which front plate is used or how many main circuit terminals are used. In such an embodiment, different front plates having different numbers of main circuit terminals can be interchanged without significantly altering the internal hardware.

In an illustrative embodiment, the power converter system 100 includes cooling ports 120. The cooling ports 120 can be used to circulate a thermal transfer fluid through the power converter system 100. The thermal transfer fluid can be a liquid or a gas. In an illustrative embodiment, the cooling ports 120 are connected to a cooling water source. Piping within the power converter system 100 places the cooling water in thermal communication with various components of the power converter system 100 that produce heat. The heat is transferred to the cooling water, and the warmed cooling water is pumped out of the power converter system 100 through one of the cooling ports 120. In alternative embodiments, any suitable cooling fluid can be used.

In some embodiments, the cooling ports 120 are not used or are not installed in the power converter system 100. For example, cooling fans can circulate ambient air through the housing of the power converter system 100 to transfer heat from the various components to the environment. In another example, the power converter system does not include an active cooling system, and natural convection can be used to dissipate heat produced by the power converter system 100.

The power converter system 100 can be installed in any suitable manner. For example, wall mounting brackets 125 can be used to mount the power converter system 100 to a wall, a post, or any other suitable vertical structure. The wall mounting brackets 125 allow the power converter system 100 to be securely mounted in an elevated position. Floor mounting bracket 130 allows the power converter system 100 to be mounted to a floor such that the system is secure and unable to tip over.

In an illustrative embodiment, the power converter system 100 and/or the power converter system 200 can have a height from top to bottom of approximately 507 millimeters (mm). A width from side to side of the power converter system can be approximately 162 mm. A length of the power converter system 200 from front to back can be approximately 445 mm. In alternative embodiments, the power converter systems described herein may have different dimensions.

Figure 5:
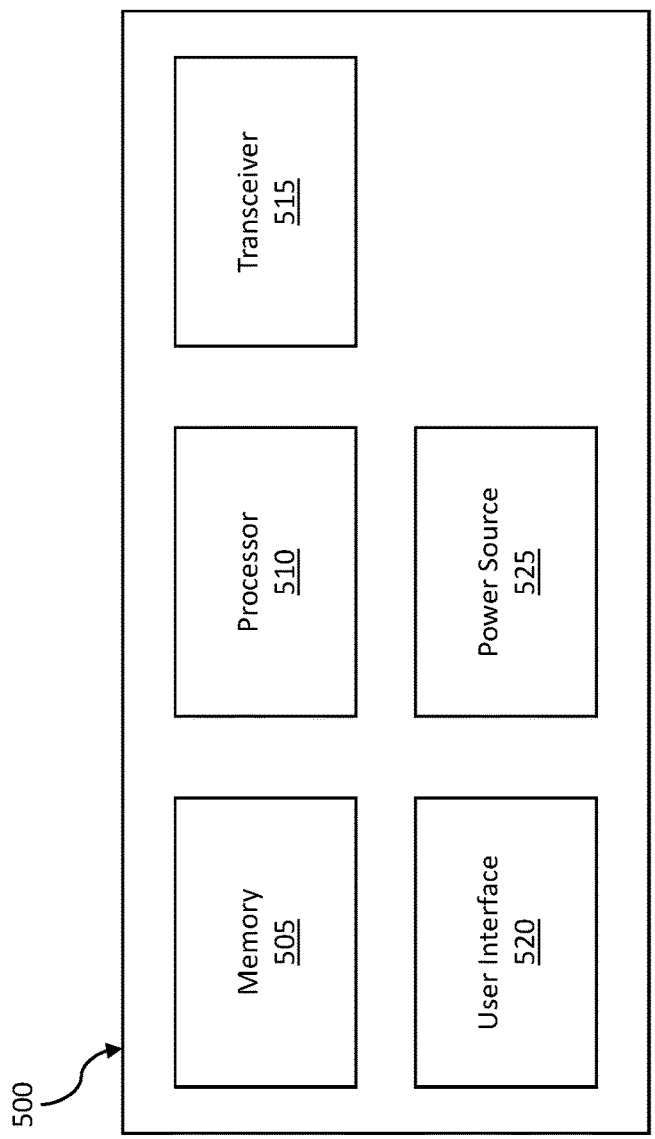
FIG. 5 is a block diagram of a computing device in accordance with an illustrative embodiment.

FIG. 5 is a block diagram of a computing device in accordance with an illustrative embodiment. An illustrative computing device 500 includes a memory 505, a processor 510, a transceiver 515, a user interface 520, and a power source 525. In alternative embodiments, additional, fewer, and/or different elements may be used. The computing device 500 can be any suitable device described herein. For example, the computing device 500 can be a controller that operates switches, such as the switches 305. The computing device 500 can be used to implement one or more of the methods described herein.

In an illustrative embodiment, the memory 505 is an electronic holding place or storage for information so that the information can be accessed by the processor 510. The memory 505 can include, but is not limited to, any type of random access memory (RAM), any type of read only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, etc. The computing device 500 may have one or more computer-readable media that use the same or a different memory media technology. The computing device 500 may have one or more drives that support the loading of a memory medium such as a CD, a DVD, a flash memory card, etc.

In an illustrative embodiment, the processor 510 executes instructions. The instructions may be carried out by a special purpose computer, logic circuits, or hardware circuits. The processor 510 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 510 executes an instruction, meaning that it performs the operations called for by that instruction. The processor 510 operably couples with the user interface 520, the transceiver 515, the memory 505, etc. to receive, to send, and to process information and to control the operations of the computing device 500. The processor 510 may retrieve a set of instructions from a permanent memory device such as a ROM device and copy the instructions in an executable form to a temporary memory device that is generally some form of RAM. An illustrative computing device 500 may include a plurality of processors that use the same or a different processing technology. In an illustrative embodiment, the instructions may be stored in memory 505.

In an illustrative embodiment, the transceiver 515 is configured to receive and/or transmit information. In some embodiments, the transceiver 515 communicates information via a wired connection, such as an Ethernet connection, one or more twisted pair wires, coaxial cables, fiber optic cables, etc. In some embodiments, the transceiver 515 communicates information via a wireless connection using microwaves, infrared waves, radio waves, spread spectrum technologies, satellites, etc. The transceiver 515 can be configured to communicate with another device using cellular networks, local area networks, wide area networks, the Internet, etc. In some embodiments, one or more of the elements of the computing device 500 communicate via wired or wireless communications. In some embodiments, the transceiver 515 provides an interface for presenting information from the computing device 500 to external systems, users, or memory. For example, the transceiver 515 may include an interface to a display, a printer, a speaker, etc. In an illustrative embodiment, the transceiver 515 may also include alarm/indicator lights, a network interface, a disk drive, a computer memory device, etc. In an illustrative embodiment, the transceiver 515 can receive information from external systems, users, memory, etc. In an illustrative embodiment, the transceiver 515 is configured to communicate via the control connection panel 115.

In an illustrative embodiment, the user interface 520 is configured to receive and/or provide information from/to a user. The user interface 520 can be any suitable user interface. The user interface 520 can be an interface for receiving user input and/or machine instructions for entry into the computing device 500. The user interface 520 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as a user, to enter information into the computing device 500. The user interface 520 can be used to navigate menus, adjust options, adjust settings, adjust display, etc. In an illustrative embodiment, the user interface 520 includes the control connection panel 115.

The user interface 520 can be configured to provide an interface for presenting information from the computing device 500 to external systems, users, memory, etc. For example, the user interface 520 can include an interface for a display, a printer, a speaker, alarm/indicator lights, a network interface, a disk drive, a computer memory device, etc. The user interface 520 can include a color display, a cathode-ray tube (CRT), a liquid crystal display (LCD), a plasma display, an organic light-emitting diode (OLED) display, etc.

In an illustrative embodiment, the power source 525 is configured to provide electrical power to one or more elements of the computing device 500. In some embodiments, the power source 525 includes an alternating power source, such as available line voltage (e.g., 120 Volts alternating current at 60 Hertz in the United States). The power source 525 can include one or more transformers, rectifiers, etc. to convert electrical power into power useable by the one or more elements of the computing device 500, such as 1.5 Volts, 8 Volts, 12 Volts, 24 Volts, etc. The power source 525 can include one or more batteries.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A configurable power converter comprising:
    a chassis;
    a first face plate selectively mountable to the chassis, the first face plate having a first plurality of circuit terminals;
    a second face plate selectively interchangeable with the first face plate, the second face plate having a second plurality of circuit terminals, the second plurality of circuit terminals of the second face plate having a different number of circuit terminals than the first plurality of circuit terminals of the first face plate, wherein each of the first plurality of circuit terminals and the second plurality of circuit terminals are configurable as input circuit terminals or output circuit terminals;
    a direct current bus within the chassis, wherein the direct current bus comprises a positive terminal and a negative terminal;
    a plurality of electrical switches electrically connected between the positive terminal and the negative terminal of the direct current bus; and
    a controller configured to:
        detect a hardware configuration of (i) the plurality of electrical switches and (ii) the first plurality of circuit terminals or the second plurality of circuit terminals;
        determine (i) which of the first plurality of circuit terminals or the second plurality of circuit terminals are output circuit terminals and (ii) which of the first plurality of circuit terminals or the second plurality of circuit terminals are input circuit terminals;
        determine a maximum voltage limit and a maximum current limit for each of the first plurality of circuit terminals or the second plurality of circuit terminals based at least on the hardware configuration;
        receive an indication regarding input power including alternating current power or direct current power provided to each of the input circuit terminals;
        operate the plurality of electrical switches to provide the input power received from the input circuit terminals to the direct current bus;
        operate the plurality of electrical switches to provide output power to one or more of the output circuit terminals from power of the direct current bus, the output power including at least one of alternating current power or direct current power, wherein the controller is configured to operate the plurality of electrical switches to prevent at least one of a voltage from exceeding the maximum voltage limit or a current from exceeding the maximum current limit for at least one respective terminal of the first plurality of circuit terminals or the second plurality of circuit terminals;

wherein a first circuit terminal of the first plurality of circuit terminals and the second plurality of circuit terminals is operated to receive or send alternating current power and a second circuit terminal of the first plurality of circuit terminals and the second plurality of circuit terminals is operated to receive or send direct current power, and wherein the first circuit terminal and the second circuit terminal are simultaneously operable.

2. The configurable power converter of claim 1, further comprising external direct current bus terminals that are configured to electrically connect to the positive terminal and the negative terminal of the direct current bus.

3. The configurable power converter of claim 2, wherein the external direct current bus terminals are mounted to the chassis.

4. The configurable power converter of claim 1, wherein each of the plurality of electrical switches comprises a transistor with a gate and a diode, wherein the controller is configured to operate the plurality of electrical switches by providing electrical power to the gate of each transistor.

5. The configurable power converter of claim 1, wherein at least one of the plurality of circuit terminals is configured to support three-phase alternating current power.

6. The configurable power converter of claim 1, wherein the first circuit terminal and the second circuit terminal are each output circuit terminals.

7. The configurable power converter of claim 1, further comprising a plurality of interchangeable electrical filter elements electrically connected to each of the plurality of circuit terminals.

8. The configurable power converter of claim 1, further comprising a plurality of electrical legs that each comprise at least two of the plurality of electrical switches, wherein each of the plurality of electrical legs are electrically connected to the positive terminal and the negative terminal of the direct current bus, and wherein each of the plurality of circuit terminals are electrically connected to at least one of the plurality of electrical legs, and wherein the at least two of the plurality of electrical switches of each of the plurality of electrical legs are connected in series, and wherein each of the plurality of circuit terminals are electrically connected to the at least one of the plurality of electrical legs between the respective electrical switches.

9. The configurable power converter of claim 1, further comprising memory configured to store a first set of settings and a second set of settings, wherein the first set of settings are stored in the memory based on user inputs received from a manufacturer's user interface, and wherein the second set of settings are stored in the memory based on user inputs received from a customer's user interface.

10. The configurable power converter of claim 9, wherein the first set of settings includes an operable voltage range and an operable current range for each of the plurality of circuit terminals, wherein the second set of settings includes a defined voltage range and a defined current range for each of the plurality of electrical switches, wherein the defined voltage range is within the operable voltage range, and wherein the defined current range is within the operable current range, and wherein the operable voltage range of each of the plurality of circuit terminals corresponds to a voltage range supported by hardware associated with a respective one of the plurality of circuit terminals, and wherein the operable current range of each of the plurality of circuit terminals corresponds to a current range supported by hardware associated with a respective one of the plurality of circuit terminals.

11. The configurable power converter of claim 9, wherein the second set of settings includes an indication of which of the plurality of circuit terminals are input circuit terminals and which are output circuit terminals.

12. The configurable power converter of claim 1, wherein the controller is further configured to determine that a respective electrical switch is not associated with any of the first plurality of circuit terminals or the second plurality of circuit terminals, and wherein operating the plurality of electrical switches does not include operating the respective electrical switch.

13. The configurable power converter of claim 1, wherein the controller is further configured to:
receive, from a manufacturer's computing device, a first set of settings comprising the maximum voltage limit and the maximum current limit;
receive, from a customer's computing device, a second set of settings comprising a user voltage limit and a user current limit; and
wherein the controller is configured to operate the plurality of electrical switches to prevent at least one of the voltage from exceeding the user voltage limit or the current from exceeding the user current limit for at least one respective terminal of the first plurality of circuit terminals or the second plurality of circuit terminals.

14. The configurable power converter of claim 1, wherein the controller is further configured to:
receive, from a plurality of sensors, an indication of the voltage and an indication of the current for each of the first plurality of circuit terminals or the second plurality of circuit terminals;
compare the indication of the voltage with the maximum voltage limit for a respective one of the first plurality of circuit terminals or the second plurality of circuit terminals; and
compare the indication of the current with the maximum current limit for the respective one of the first plurality of circuit terminals or the second plurality of circuit terminals;
wherein operating the plurality of electrical switches is based at least in part on the comparison of the indication of the voltage and the maximum voltage limit and on the comparison of the indication of the current and the maximum current limit.

15. The configurable power converter of claim 1, wherein the controller is further configured to monitor the voltage of the direct current bus and operate the plurality of switches to maintain a consistent voltage of the direct current bus.

16. The configurable power converter of claim 1, further comprising a cooling port extending externally from the chassis, the cooling port configured to facilitate circulating a thermal transfer fluid internally through the chassis to thermally regulate the configurable power converter.

17. The configurable power converter of claim 1, wherein the first plurality of circuit terminals are mounted to the first face plate and the second plurality of circuit terminals are mounted to the second face plate such that the first plurality of circuit terminals and the second plurality of circuit terminals are positioned externally from an interior of the chassis.

18. A configurable power converter comprising:
a chassis having an exterior and defining an interior cavity;

a plurality of circuit terminals coupled to the exterior of the chassis, the plurality of circuit terminals including one or more input terminals and one or more output terminals;

a current bus disposed within the interior cavity of the chassis;

power conversion hardware disposed within the interior cavity of the chassis and connected to the plurality of circuit terminals and the current bus, the power conversion hardware including at least one of a plurality of electrical switches, a plurality of capacitors, or a plurality of inductors; and a controller configured to:
  detect a hardware configuration of the plurality of circuit terminals;
  determine (i) which of the plurality of circuit terminals are output terminals and (ii) which of the plurality of circuit terminals are input terminals;
  determine a maximum voltage limit and a maximum current limit for each of the plurality of circuit terminals based at least on the hardware configuration;
  receive an indication regarding input power including alternating current power or direct current power provided to each of the one or more input terminals;
  operate the plurality of electrical switches to provide the input power received from the one or more input terminals to the current bus;
  operate the plurality of electrical switches to provide output power to at least one of the one or more output terminals from power of the current bus, the output power including at least one of alternating current power or direct current power; and
  operate the plurality of electrical switches to prevent at least one of a voltage from exceeding the maximum voltage limit or a current from exceeding the maximum current limit for at least one respective terminal of the plurality of circuit terminals.

* * * * *